United States Patent

Wakata et al.

[11] Patent Number: 5,433,623
[45] Date of Patent: Jul. 18, 1995

[54] COUPLING DEVICE OF CHARGING CONNECTOR ASSEMBLY FOR ELECTRIC CAR

[75] Inventors: Shigekazu Wakata; Hikaru Itou; Sho Miyazaki; Tsutomu Tanaka; Eiji Saijo, all of Yokkaichi, Japan

[73] Assignee: Sumitomo Wiring Systems, Ltd., Japan

[21] Appl. No.: 229,389

[22] Filed: Apr. 18, 1994

[30] Foreign Application Priority Data

| Apr. 19, 1993 | [JP] | Japan | 5-116342 |
| Apr. 19, 1993 | [JP] | Japan | 5-116345 |
| Apr. 19, 1993 | [JP] | Japan | 5-116346 |
| Apr. 21, 1993 | [JP] | Japan | 5-119174 |

[51] Int. Cl.⁶ ......................................... H01R 13/453
[52] U.S. Cl. ......................................... 439/310
[58] Field of Search ............... 439/261, 372, 341, 342, 439/835, 822, 310

[56] References Cited

U.S. PATENT DOCUMENTS

| 2,329,479 | 9/1943 | Neill | 439/372 X |
| 3,950,059 | 4/1976 | Anhalt et al. | 439/261 OR |
| 4,083,619 | 4/1978 | McCormick et al. | 439/310 OR |
| 4,624,472 | 11/1986 | Stuart et al. | 439/310 X |
| 5,344,331 | 9/1994 | Hoffman et al. | 439/310 X |

FOREIGN PATENT DOCUMENTS 190068 8/1991 Japan .
334908 11/1992 Japan .

Primary Examiner—Larry I. Schwartz
Assistant Examiner—Daniel Wittels
Attorney, Agent, or Firm—Jordan B. Bierman; Bierman and Muserlian

[57] ABSTRACT

A coupling device interconnects a car connector BC and a charger connector SC positively under a small force to charge a battery in an electric car. After bringing housing 1 and 2 of both connectors BC and SC, when an operation lever 8 together with a grip 32 are grasped, an engaging projection 229 pushes a rear end of a coupling groove 228 so that a coupling plate 10 is moved from an advanced position to a retracted position. During a former movement of the plates 10, a projection 232 rids on an inner side from a rear edge of an escape groove 233 so that distal ends of the coupling plates 10 are closed. Consequently, windows 231 in the plates receive projections 209 on the housing of the car connector BC. The housing 2 of the charger connector SC together with a body 3 are drawn into the housing 1 during a latter movement of the plates, thereby completely interconnecting both connectors BC and SC. When the lever 8 returns to an opening position, the coupling plate 10 is backed from the retracted position to return the housing 2 together with the body 3 and the distal end of the coupling plates 10 are widened to detach the housing 1. When the body 3 is pulled, both connectors BC and SC are separated.

13 Claims, 16 Drawing Sheets

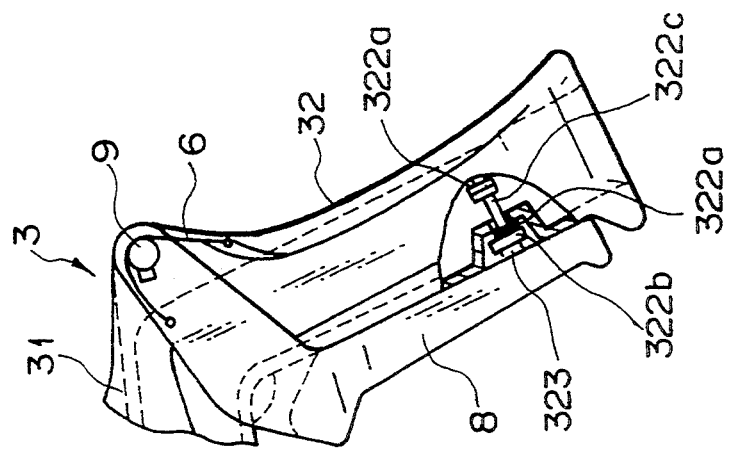
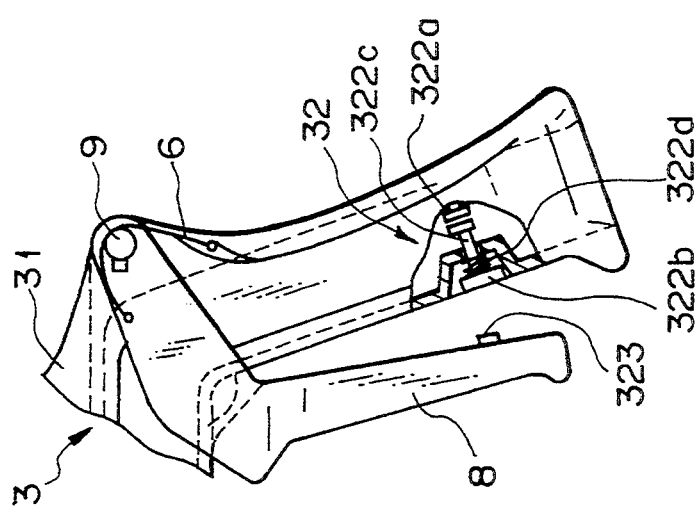

COUPLING DEVICE OF CHARGING CONNECTOR ASSEMBLY FOR ELECTRIC CAR

BACKGROUND OF THE INVENTION

1. Field of the Invention

This invention relates to a coupling device of a charging connector assembly for an electric car and more particularly to a coupling device which can be operated under a relatively small force.

2. Statement of the Prior Art

An electric car or automobile will be put to practical use in a near future. At that time, it will be impossible to avoid a problem of charging a battery in the electric car. In particular, a charging connector assembly will be one of important problems to be discussed. The charging connector assembly comprises a car connector connected to a battery in the electric car and a charger connector connected to a charger through a cable.

However, it is necessary to apply a large force to the charging connector in order to positively interconnect terminals in each connector. If a substantial load is caused due to a friction resistance between the connectors during coupling, this may be mistaken for complete coupling. In the case of conducting a charging current through the assembly in the incomplete coupling state, the terminals will generate heat or sparks therebetween when both connectors are displaced.

It is also desired to start conducting after both connectors of the assembly have been completely coupled.

One of the problems in the charging connector assembly is to start a charging operation in the incomplete coupling state of the connectors. If this is done, an abnormal heat may be caused in the assembly, oxidation due to sparks may be caused on the terminals in the assembly, or the assembly will give an operator any electrical shock.

There is a conventional charging connector in which one connector is provided on an outer periphery of an end with a male thread and the other connector is provided on an outer periphery with a rotatable ring which has a female thread adapted to be engaged with the male thread.

The connectors are electrically interconnected by opposing the connectors with each other and rotating the rotatable ring so as to mate the male and female threads. The connectors are electrically disconnected from each other by turning the rotatable ring in a reverse direction.

In the conventional connector assembly mentioned above, the male and female threads are mated with each other by rotation of the rotatable ring to couple both connectors. However, coupling of thread engagement can be easily released.

In comparison with the car connector secured to the car, the charger connector is connected to the charger through the cable.

The charging connector assembly is a relatively large size since a charging current is high and terminals become a large size in compliance with the high current. Since the charger connector is connected to an end of the long cable, a total weight of the connector and cable will be a high amount. Accordingly, it is necessary to make handling of the charger connector easy before hand.

Both connectors must be locked to prevent the charger connector from falling off from the car connector after being coupled. However, since the operator must continuously maintain a coupling force before locking operation has been finished, the operator will be tired. If the operator releases one's hold from the connector assembly in the incomplete coupling state, the charger connector will fall down and be broken. Particularly, such accident will happen in view of the weight of the charger connector.

A coupling device of a charging connector assembly for an electric car must maintain a car connector and a charger connector in a coupling state during charging and release the connectors from coupling after finishing of charging. A coupling device having a lock piece is known which engages with, for example, the charger connector by rotation to maintain the coupling state of both connectors.

However, in the case of using such coupling device, the operator must hold the charger connector by one hand and handle the lock piece by the other hand. Such handling will be troublesome for the operator. Further, the operator must handle the lock piece again to release the connectors after charging has finished.

In a real charging operation, the operator holds the charger connector and pushes it onto the car connector. If, in this case, insulation in the charger connector should deteriorate to leak out the charging current, a serious accident will happen.

As described above, it is necessary to take into consideration of coupling operation and safety of charging in designing of the charging connector assembly. For example, a mechanism for aiding a coupling force or a switch mechanism which permits conduction after confirming a safe condition is required. Particularly, it will be preferable to form the charger connector into a gun type shape in order to facilitate the coupling operation. In addition to the gun type shape, a lever may be provided to enhance handling of the coupling device.

However, even if the lever is provided on the device, it may be actuated before completing a condition of coupling aid and safety unless the lever is constrained from operating under an unsafe condition.

SUMMARY OF THE INVENTION

A first object of the present invention is to provide a coupling device which can positively Unite a charging connector assembly for an electric car by a relatively small force.

A second object of the present invention is to provide a coupling device which can positively and safely charge a battery in an electric car through a charging connector assembly.

A third object of the present invention is to provide a coupling device which can release a charging connector for an electric car only when required.

A fourth object of the present invention is to provide a coupling device which can maintain in a temporary coupling position a charging connector assembly for an electric car.

A fifth object of the present invention is to provide a coupling device which can readily unite and detach a charging connector for an electric car.

A sixth object of the present invention is to provide a coupling device which can secure an operator from charging a battery in an electric car through a charging connector.

A seventh object of the present invention is to provide a coupling device which can readily handle a lever upon charging a battery in an electric car through a charging connector.

In order to achieve the above first through seventh objects, a coupling device of a charging connector assembly for an electric car in accordance with the present invention interconnects a car connector and a charger connector to charge a battery in the electric car. The coupling device comprises: a gun type body having a barrel portion and a grip; an operation lever pivotably connected to a proximal end of said barrel portion and biased by an elastic member toward a direction moving away from said grip; means for locking said operation lever at a closing position near said grip; a link mechanism mounted on a proximal end of said barrel portion and engaging with an end of said operation lever; a front cover mounted on a distal end of said barrel portion for accommodating said charger connector; and coupling means mounted on said barrel portion movably along its longitudinal direction and having an end coupled to said link mechanism and the other end coupled to either one of both said connectors.

In order to achieve the first object of the present invention, in a coupling device of the present invention, said link mechanism translates a swinging motion of said operation lever into a linear reciprocating motion of said coupling means. Said link mechanism comprises a support axis for rotatably supporting said operation lever on the proximal end of said barrel portion, a guide member for movably supporting said coupling means on said barrel portion, and a joining member for slidably joining said operation lever and said coupling means together. Said support axis is disposed at a position above said joining member, wherein said coupling means is provided on the other end with engaging means. Said coupling means are moved back toward the proximal end of said barrel portion, so that said engaging means engage with said car connector, when said operation lever is actuated to move to said closing position, thereby interconnecting both said connectors.

In the coupling device, said support axis may be disposed at a position below said joining member. The other end of said coupling means is connected to said charger connector wherein said charger connector is received slidably in said front cover. Said coupling means are moved forth toward the distal end of said barrel portion, when said operation lever is actuated to move said closing position, thereby interconnecting both said connectors.

In order to achieve the third and fifth objects of the present invention, in a coupling device of the present invention, said locking means include a member which detachably interconnects lower ends of said operation lever and grip. The member may be a retaining ring, a plunger, or a lock piece.

In order to achieve the fourth object, a coupling device further comprises a mechanism for temporarily and detachably coupling both said connectors.

In order to achieve the second and sixth objects of the present invention, a coupling device of the present invention further comprises means for starting electrical conduction when both of said connectors are completely coupled. Said starting means of electrical conduction may be a switch which is closed when said operation lever is moved to said closing position, or a switch member provided on a pushing portion of said operation lever for turning a charging circuit off only upon actuating said pushing portion.

In order to achieve the seventh object of the present invention, a coupling device of the present invention further comprises means for restraining said operation lever from moving to said closing position until both said connectors reach a given incomplete coupling position.

BRIEF DESCRIPTION OF THE DRAWINGS

FIGS. 16A and 16B are fragmentary side views of an eighth embodiment of the coupling device in accordance with the present invention;

DETAILED DESCRIPTION OF THE PREFERRED EMBODIMENTS

Figure 1:
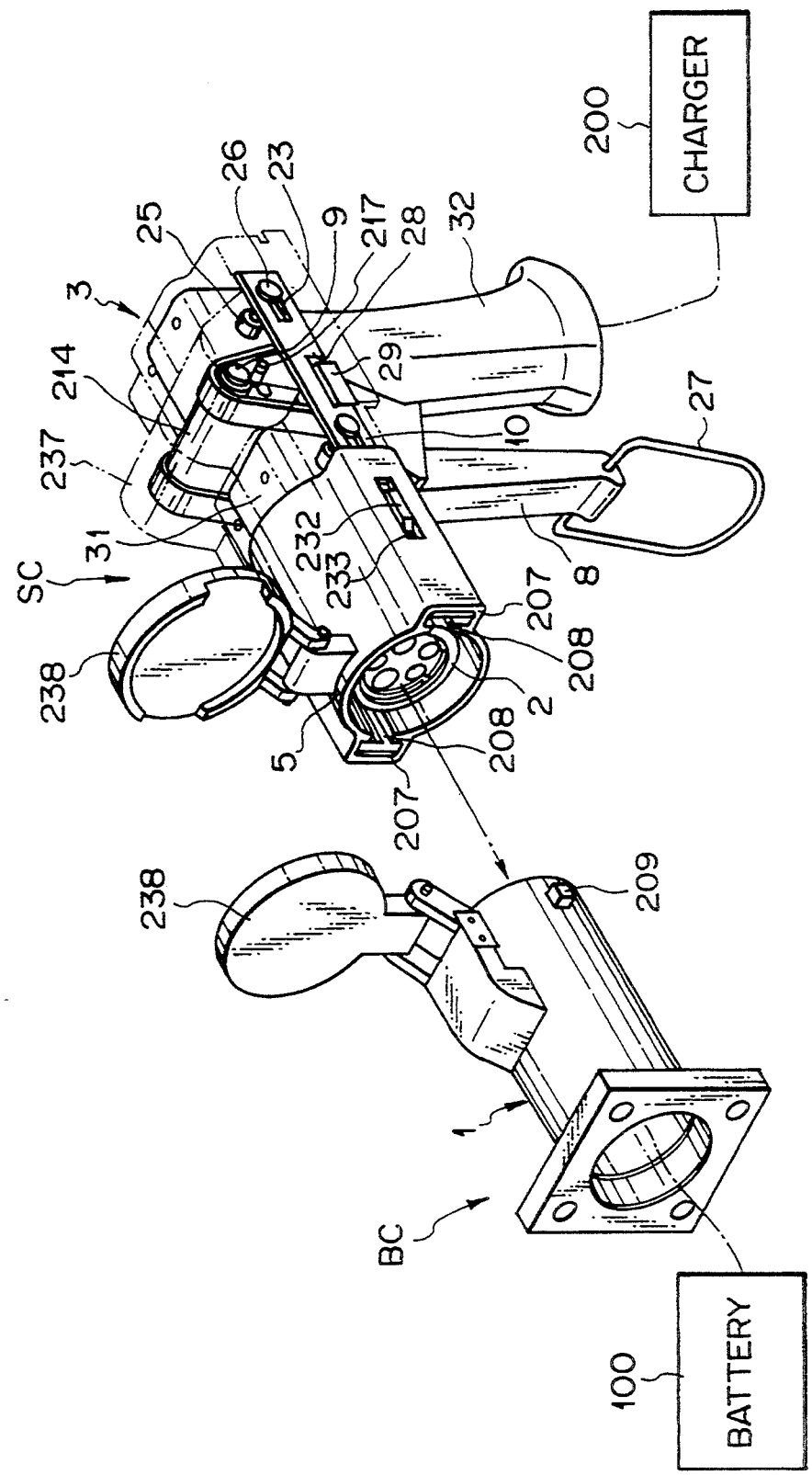
FIG. 1 is an exploded perspective view of a first embodiment of a coupling device in accordance with the present invention.

By referring now to the drawings, embodiments of a coupling device of a charging connector assembly for an electric car in accordance with the present invention will be explained below.

FIGS. 1 through 3B show a first embodiment of the coupling device of the present invention. In the drawings, a connector housing 1 of a car connector BC accommodates male terminals and the like connected to a battery 100 in an electric car and is secured to a given position in the car.

A connector housing 2 of a charger connector SC accommodates female terminals and the like connected to a charger 200 to be as a power source. The housing 2 is mounted in a front cover 5 attached coaxially to a barrel portion 31 of a gun type body 3 with a clearance being provided between the outer periphery of the housing 2 and the inner periphery of the front cover 5 to receive the housing 1 of the car connector BC.

The front cover 5 is provided on opposite sides of an inner face with insertion chambers 207 extending along the axial direction of the cover 5 and receiving coupling plates 10. Each insertion chamber 207 is provided in an exterior with a guide groove 208 extending in the axial direction and opening at a distal end. The housing 1 of the car connector BC is provided on opposite sides on an outer face with a pair of projections 209 which are adapted to be inserted into the guide grooves 208 and have a height enough to project in the insertion chamber 207 by a certain length.

When an operator holds a grip 32 of a body 3 and pushes the body 3 into the housing with the projection 209 being fitted in the guide groove 208, the housing 2 of the charger connector SC is inserted into the housing 1 of the car connector BC. When the housing 2 is pushed in the housing by a certain depth both housings 1 and 2 are maintained at an incomplete coupling position by means of temporary coupling means not shown.

Then, a construction which brings both connectors into a complete coupling position will be explained below.

An operation lever 8 is rotatably attached to a grip 32 of the body 3 by an axis 9 to be held together with the grip 32. The lever 8 is biased by a torsion spring 6 so that the lever 8 is swung around the axis 9 in a direction leaving from the grip 32. The lever 8 is constrained from swinging over a given open angular position.

Each coupling plate 10 is disposed in each insertion chamber 207 provided on opposite sides of the front cover 5 and extends longitudinally on the exterior of the body 3.

The coupling plate 10 is formed into an elongated plate and an end of the plate 10 is inserted in the insertion chamber 207. The coupling plate 10 is provided on the other end with a pair of slits 23 which are slidably supported by popper pins 26 secured to bosses 25 on the body 3. The coupling plate 10 is provided with a joining groove 28 on its lower side between the slits 23. A joining projection 29 which is provided below the rotary axis 9 on the lever 13 is fitted in the joining groove 28.

The coupling plate 10 is provided on its front side end with an engaging window 231, which is adapted to receive a projection 209 on the housing 1, and on its rearward position from the window 231 with a hill portion 232, which projects outwardly and has ramps on opposite ends. The hill portion 232 is adapted to be fitted in an escape groove 233 in an outer wall of the insertion chamber 207.

A compression coil spring 35 is mounted on the popper pin 26 to bias the coupling plate 10 outwardly. A head of the popper pin 26 restrain the plate from moving outwardly.

The coupling plates 10 and body 3 are protected by a cover 237 (see FIG. 1). Caps 238 are attached to the housing 1 of the car connector BC and the front cover 5 of the charger connector SC to protect open ends when they are not used.

The operation lever 8 is provided on its lower end with a retaining ring 27 which is latched on a lower end of the grip 32 to serve as locking means.

Next, an operation of the first embodiment will be explained below.

Figure 2A:
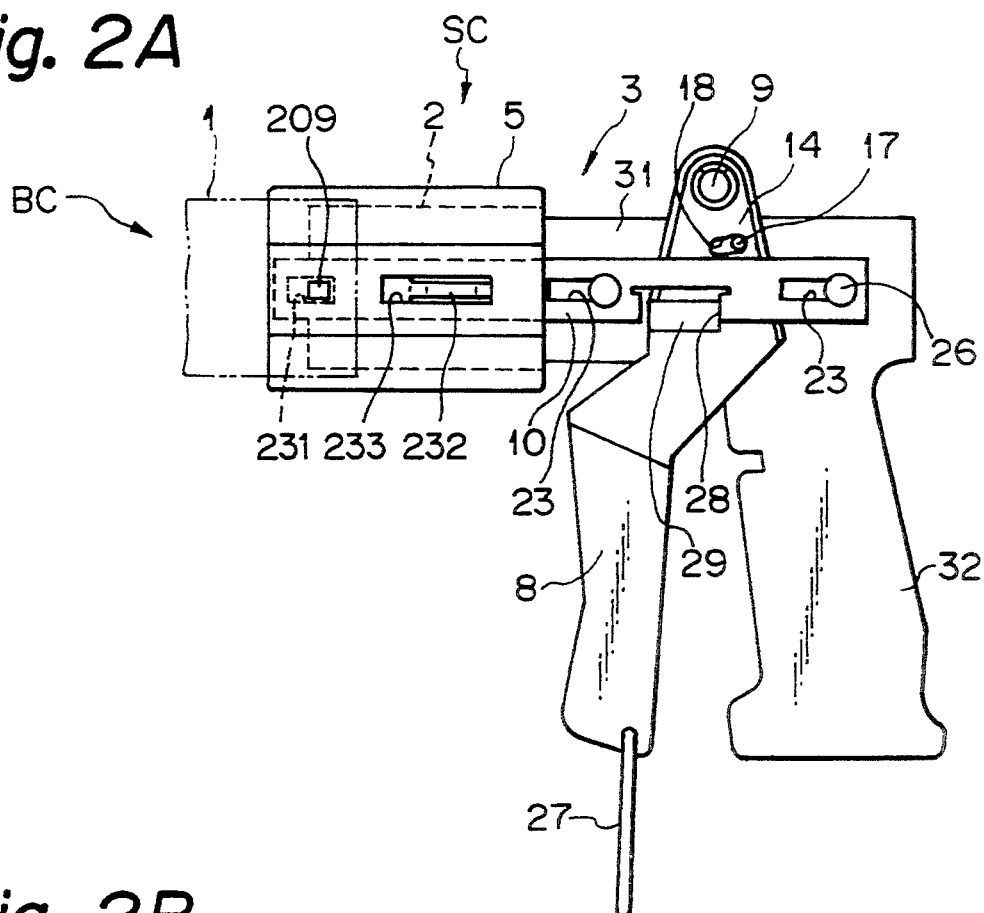
FIGS. 2A and 2B are side views similar to FIG. 1, illustrating a position (A) prior to completely coupling and a position (B) after completely coupling.
Figure 2B:
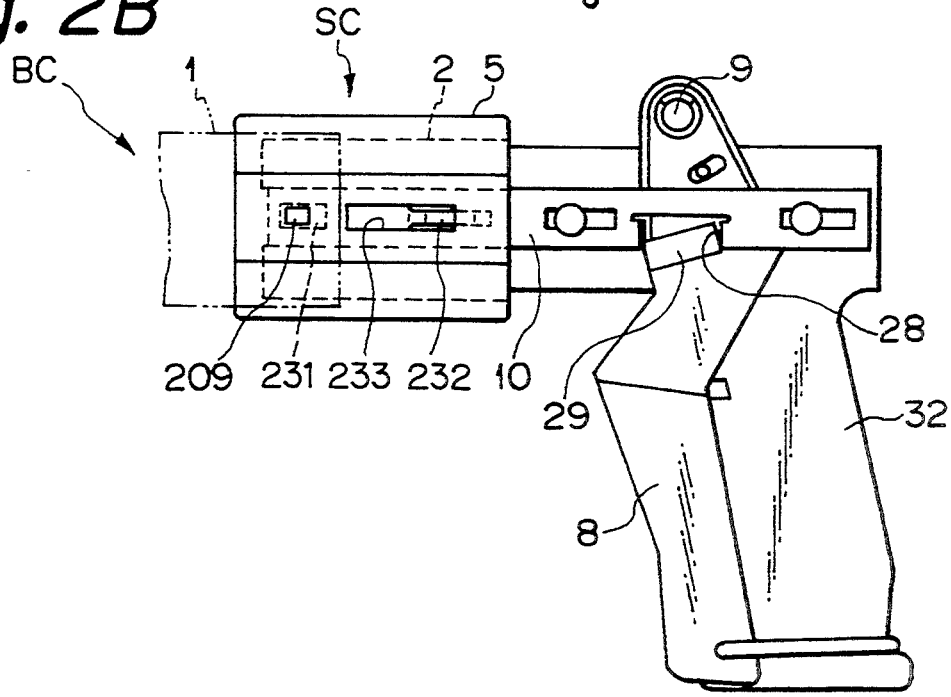
Figure 3A:
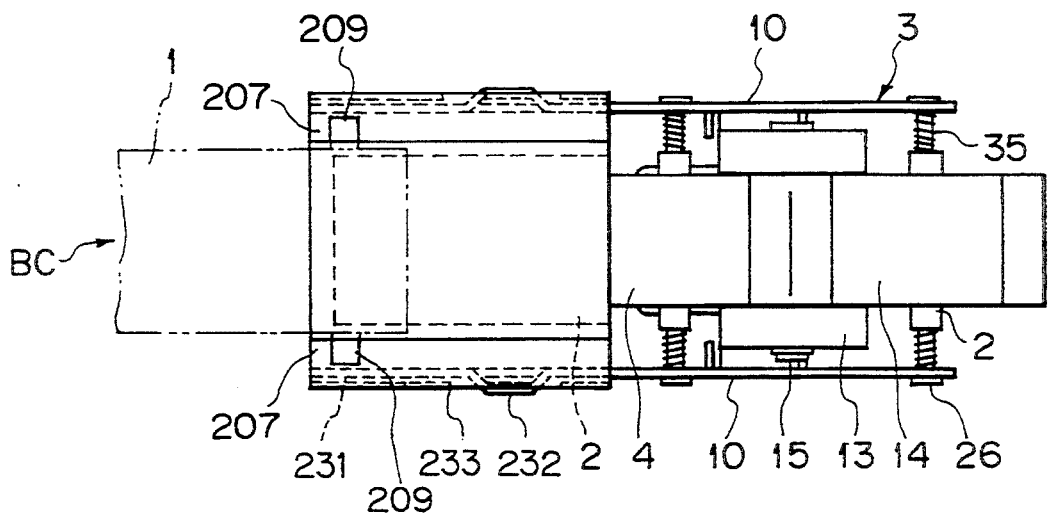
FIGS. 3A and 3B are plan views of the coupling device shown in FIGS. 2A and 2B.
Figure 3B:
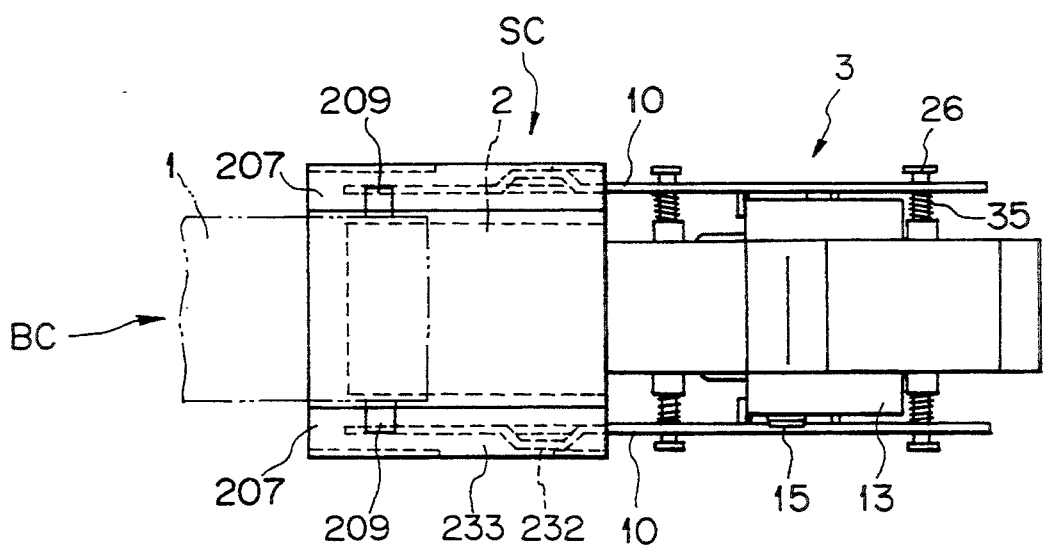

First, after detaching both caps 238, an operator holds the grip 32 of the body 3 without pulling the lever 8 and inserts the housing 2 of the charger connector SC into the housing 1 of the car connector BC in a direction shown by an arrow in FIG. 1 until the housing 2 reaches a given incomplete coupling position shown in FIGS. 2A and 3A.

At this time, the coupling plate 10 is disposed at the advanced position, the hill portion 232 enters in the escape groove 233 in the insertion chamber 207, and the compression coil spring 235 pushes the coupling plate 10 outwardly so that the plate 10 is separated away from the projection 209 on the housing 1 of the car connector BC, thereby enabling the housing 1 to be inserted into the housing 2.

Then, when the operator pulls the lever 8 against a biasing force of the torsion spring, the joining projection 29 on the lever 8 turns backwardly about the rotary axis 9 to push the rear edge of the joining groove 28, thereby retracting the coupling plate 10.

During successive retracting movement, the rear edge ramp of the hill portion 232 on the coupling plate 10 engages with the rear edge of the escape groove 233 in the insertion chamber 207 and the hill portions 232 rides on the interior of the insertion chamber 207 against the spring 35 to close the plates 10, thereby fitting the projection 209 on the housing 1 of the car connector BC in the engaging window 231.

The window 231 engages with the projection 209 at a front edge during successive retracting movement, thereby pulling the housing 1 of the car connector BC. Since the B car connector BC is secured to the car, the housing 2 together with the body 3 of the charger connector 2 is pulled relatively to the housing 1 of the car connector BC, thereby completely coupling both connectors BC and SC.

Then, the retaining ring 27 attached to the lower end of the lever 8 is latched on the lower end of the grip 32 to maintain the lever 8 in the closing position. Consequently, the connectors BC and SC are maintained at the complete coupling position and being to charge.

When charging is finished, the retaining ring 27 is unlatched from the lever 8 and the lever 8 is returned to the opening position by the biasing force of the torsion spring 6. Then, the joining projection 29 on the lever 8 pushes the front edge of the joining groove 28 in the plate 10 to move the plate 10 from the retracted position to the advanced position. The rear edge of the engaging window 231 abuts on and pushes the projection 209 on the housing 1 of the car connector BC. When the rear edge ramp of the hill portion 282 engages with the rear edge of the escape groove 233, the coupling plate 10 is advancing while widening the distance between the distal ends thereof by means of the elastic force of the spring 35. The housing 2 of the charger connector SC together with the body 3 are returned to the incomplete coupling position so that the coupling window 231 in the plate 10 detaches the projection 209 on the housing 1 of the car connector 1. They are easily detached by pulling the body 3.

According to the first embodiment of the present invention, it is possible to positively interconnect both connectors by a small force by changing a lever motion by means of the grip 32 and lever 8 to a reciprocating motion of the coupling plate 10 through a link mechanism and by pulling the housing 1 of the car connector BC relative to the housing 20 of the charger connector SC.

Next, a second embodiment of the present invention will be explained by referring to FIGS. 4A and 4B.

In the second embodiment, a rear end of the housing 2 of the charger connector SC is slidably inserted into a guide cylinder 240 fitted in an inner part of the front cover 5. A pair of coupling plates 10a are slidably coupled to the housing 2 by means of two pairs of pins 26 and slits 23. A joining projection 29a above a rotary axis 9a on the lever 8a engages slidably with the joining groove 28a in a lower side of the plate 10a.

Figure 4A:
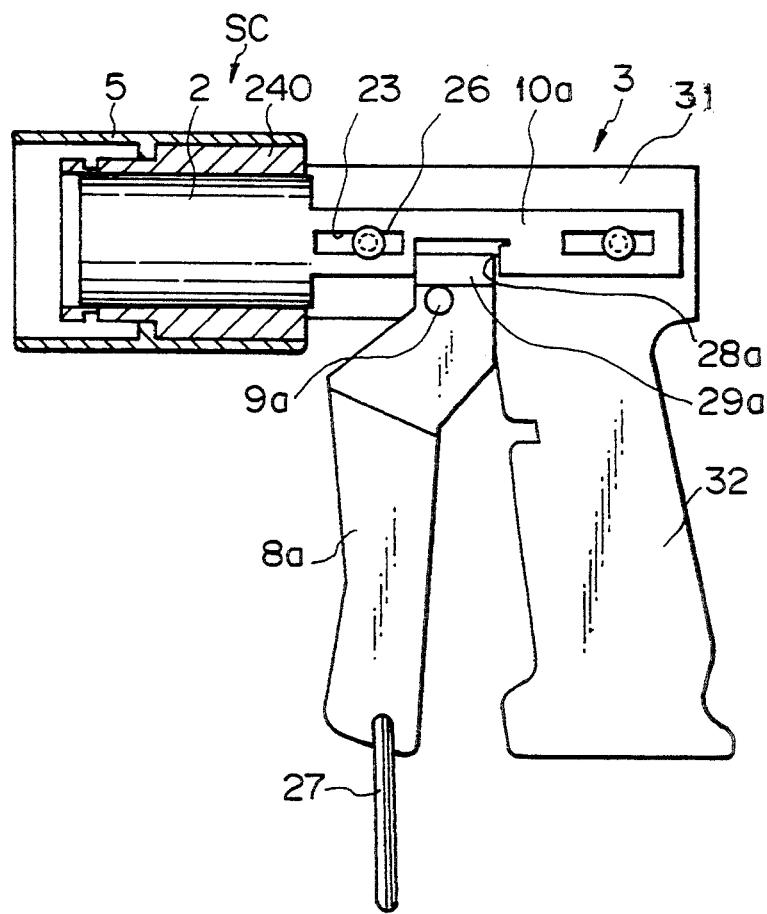
FIGS. 4A and 4B are side views of a second embodiment of the coupling device in accordance with the present invention, illustrating a position (A) at the starting of coupling and a position (B) at the finishing of coupling.
Figure 4B:
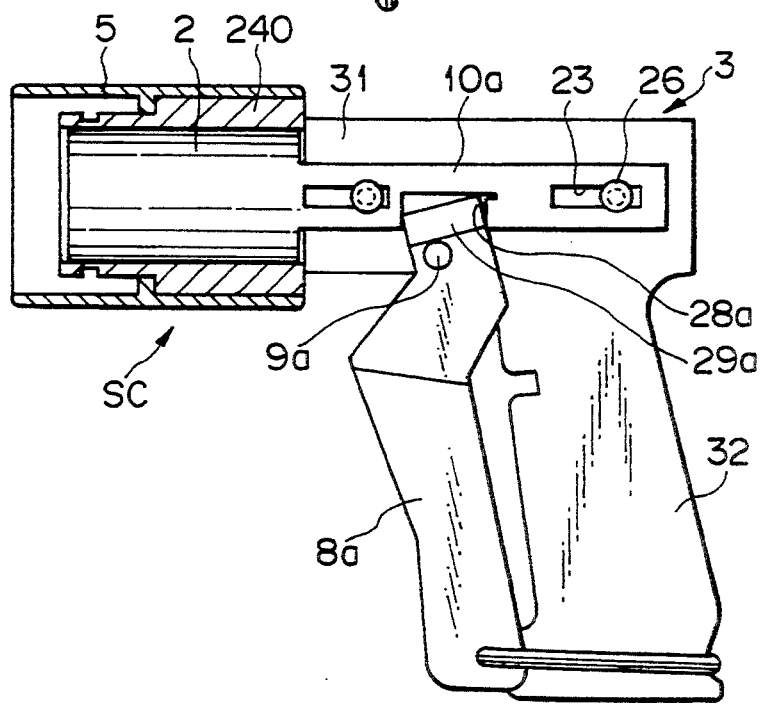

As shown in FIG. 4A, when the lever 8a is pulled after incompletely interconnecting both connectors BC and SC, the joining projection 29a turns forwardly about the rotary axis 9a since the projection 29a is disposed above the rotary axis 9a, and pushes the front edge of the joining groove 28a. Then, the coupling plate 10a moves from the advanced position to the retracted position, the housing 2 is pulled back and the housings 1 and 2 return to the incomplete coupling position. Both connectors BC and SC are disconnected by pulling the body 3.

It is possible in the second embodiment to positively interconnect both connectors under a small force by changing a lever motion by means of the lever 8 to a reciprocating motion of the coupling plate 10a and by pushing the housing 2 connected to the plate 10a into the housing 1.

Next a third embodiment of the coupling device of the present invention will be explained by referring to FIGS. 5 through 7. The third embodiment utilizes a plunger as locking means for the operation lever.

Figure 5:
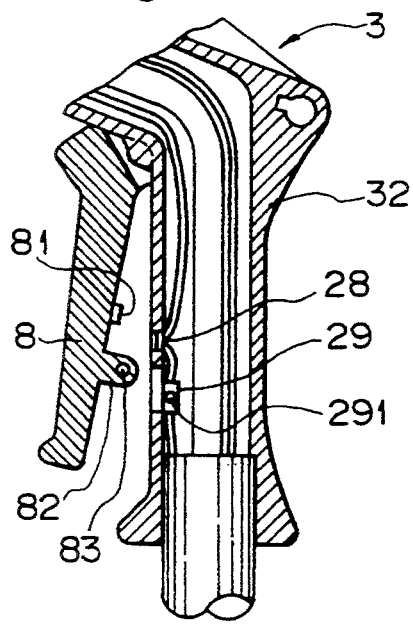
FIG. 5 is a fragmentary longitudinal sectional view of a third embodiment of the coupling device in accordance with the present invention.
Figure 6:
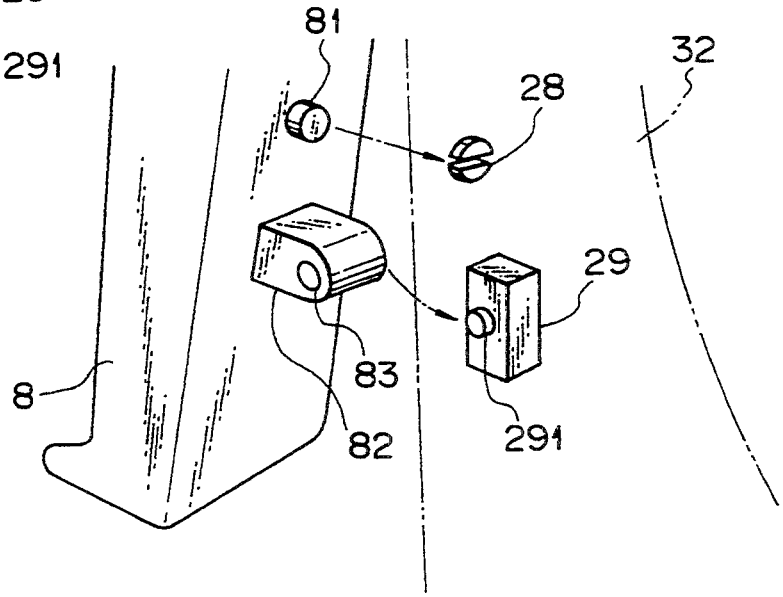
FIG. 6 is a perspective view of FIG. 5.

As shown in FIGS. 5 and 6, an operation lever 8 is provided with a switch pin 81 and an engaging block 82 having a hole 83 on an inner face opposing to a grip 32. The grip 32 is provided on an outer face opposing the lever 8 with openings corresponding to the pin 81 and block 82 when the lever 8 approaches the grip 32. A switch 28 is disposed in one opening and a solenoid 29 having a plunger 291 is disposed in the other opening. When the lever 8 approaches the grip 32, the pin 81 abuts on the switch 28 and the hole 83 receives the plunger 291.

Figure 7:
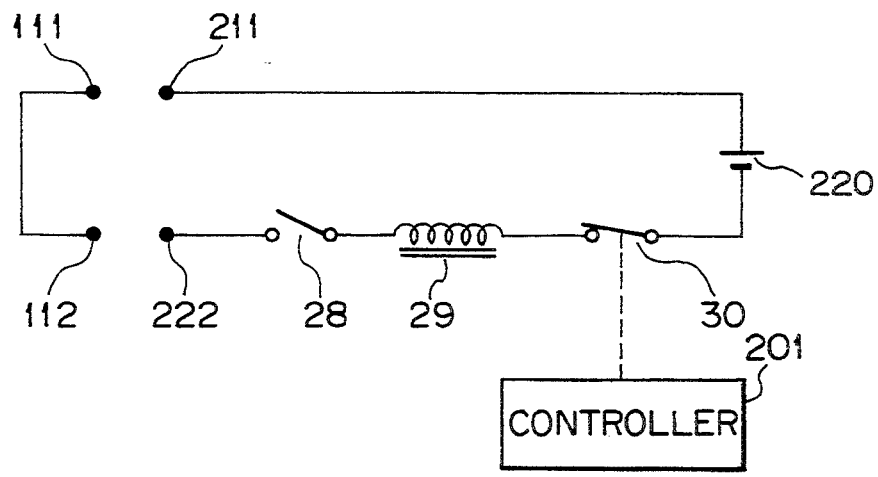
FIG. 7 is an electrical circuit of locking means shown in FIG. 5.
Figure 8:
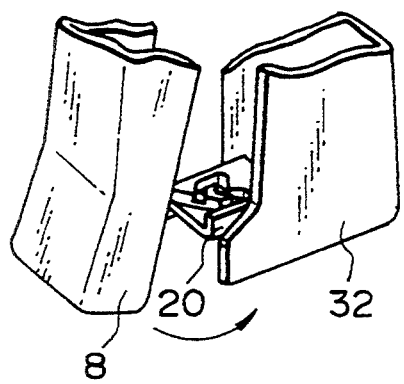
FIG. 8 is a fragmentary perspective view of a fourth embodiment of the coupling device in accordance with the present invention.

As shown in FIG. 7, the car connector BC has coupling-detection terminals 111 and 112 while the charger connector SC has coupling-detection terminals 211 and 212 adapted to be connected to the terminals 111 and 112, respectively. As shown in FIG. 7, a controlling circuit is constituted by the terminals 111, 112, 211 and 212, the switch 28, the solenoid 29, a switch 30 controlled by a controller 201, and a battery 220.

Some of terminals in the housing 1 of the car connector BC are power terminals connected to the battery 100 while some of the terminals in the housing 2 of the charger connector SC are power terminals connected to the charger 200 and adapted to supply a charging power to the battery 100. The switch 30 is turned to OFF by the controller 201 in response to a given voltage between the power terminals.

A locking means is constituted by the engaging block 82 and the plunger 291 of the solenoid 29. The plunger 291 is adapted to be inserted into the hole 83 in the engaging block 82. Further, a coupling-detection means is constituted by the switch pin 81 and the switch 28. When the pin 81 contacts with the switch 28, the solenoid 29 is energized. A conducting detection means is constituted by the controller 201, switch 30, and solenoid 29. When the controller 201 detects a given voltage between the power terminals, the switch is turned to OFF to shut a current to the solenoid 29.

The engaging block 82 and switch pin 81 enter into the respective openings to turn the switch to ON. Since the coupling-detection terminals 111 and 112 are connected to the coupling-detection terminals 211 and 212 when the respective terminals in the respective housings 1 and 2 are interconnected, the controlling circuit shown in FIG. 7 is completely closed to energize the solenoid 29. Then, the plunger projects to enter into the hole 83 in the block 82, thereby locking the lever 8 on the grip 32.

When the power terminals 111 and 112 are connected to the power terminals 211 and 212 to charge the battery 100, a voltage in the battery 100 is rising. When the charging voltage rises over a threshold value, the controller 201 turns the switch 30 to OFF. Then, since the controlling circuit shown in FIG. 7 is opened, the solenoid 29 is released and the plunger 291 comes out of the hole 83 in the engaging block 82 and returns into a body of the solenoid 29.

Next, a fourth embodiment of the coupling device of the present invention will be explained by referring to FIGS. 8 through 11. The fourth embodiment utilizes a lock piece for locking the operation lever on the grip.

Figure 9:
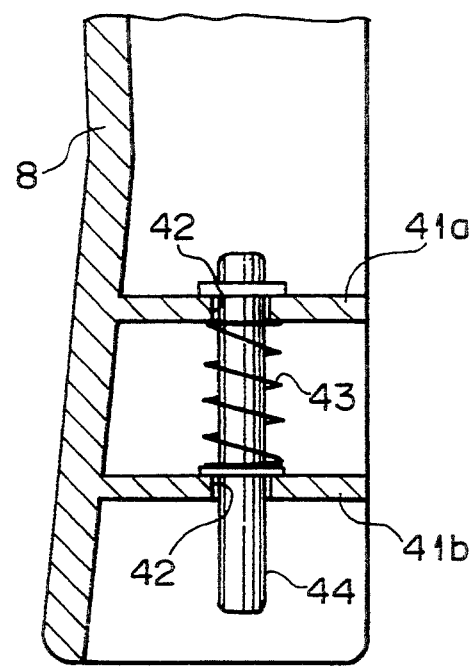
FIG. 9 is a fragmentary sectional view of an operation lever shown in FIG. 8.
Figure 10:
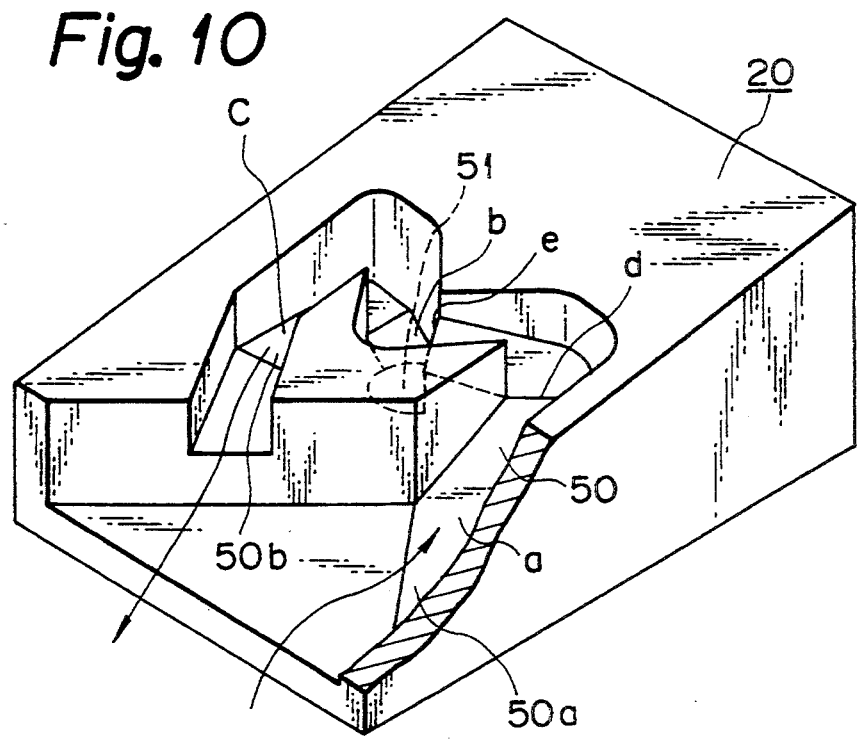
FIG. 10 is a perspective view of a lock piece.
Figure 11:
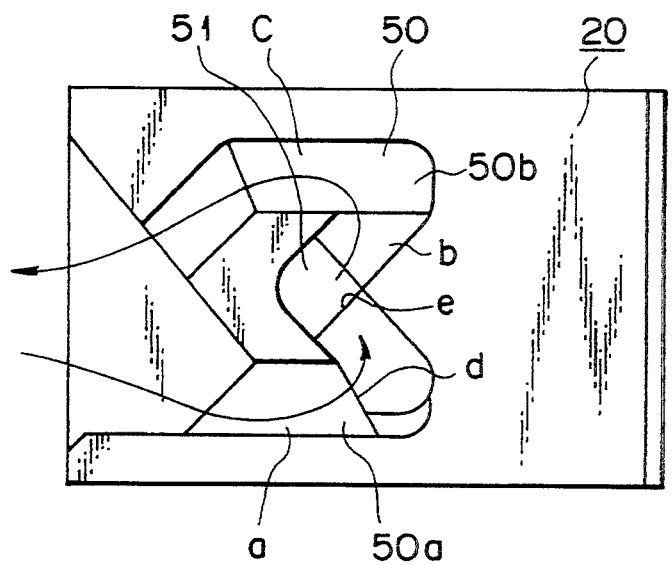
FIG. 11 is a plan view of FIG. 10.

A grip 32 is open at a front side and is provided on a bottom plate with a lock piece 20. As shown in FIGS. 9, 10 and 11, the lock piece 20 is provided with a guide groove 50 which guides an end of a stopper pin 44. The guide groove 50 has an inlet portion 50a which guides the stopper pin 44 upon a first pulling action of the operation lever 8 and an outlet portion 50b which guides the stopper pin 44 upon a second pulling action of the lever 8. A lock recess 51 which locks the stopper pin 44 is formed between the portions 50a and 50b. The guide groove 50 is provided on its bottom face with ramps a, b and c which guide the pin 44 smoothly and shoulders d and e which prevent the pin from returning.

When the grip 32 and operation lever 8 are grasped to effect the first pulling action, the stopper pin 44 attached to a lower end of the operation lever 8 is guided by the guide groove 50 in the lock piece 20 to move through the inlet portion 50a and engage with the lock recess 51. Even if the operator releases the operation lever 8, the lever 8 is maintained in the closing position, thereby maintaining both connectors in the complete coupling position to charge the battery.

When the lever 8 is actuated by the second pulling action after charging, the stopper pin 44 comes out of the lock recess 51. When the operator releases the lever 8, the lever 8 returns to the original opening position by the biasing force of the spring 6. Then, the stopper pin 44 disengages from the guide groove 50 through the outlet portion 50b.

It is possible in the fourth embodiment to displace the housings 1 and 2 of the car and charger connectors BC and SC from the incomplete coupling position to the complete coupling position merely by grasping the grip 32 and lever 8 and pulling the lever 8 to the grip 32 and to carry out such handling by one hand. It is also possible to readily carry out coupling and detaching since the second pulling action can return both connectors to the incomplete coupling position.

Next, a fifth embodiment of the present invention will be explained by referring to FIGS. 12A, 12B and 12C.

In the fifth embodiment, the coupling device of the present invention further comprises means for restraining an operation lever 8 from moving to the closing position until both connectors BC and SC reach a given incomplete coupling position.

Figure 12A:
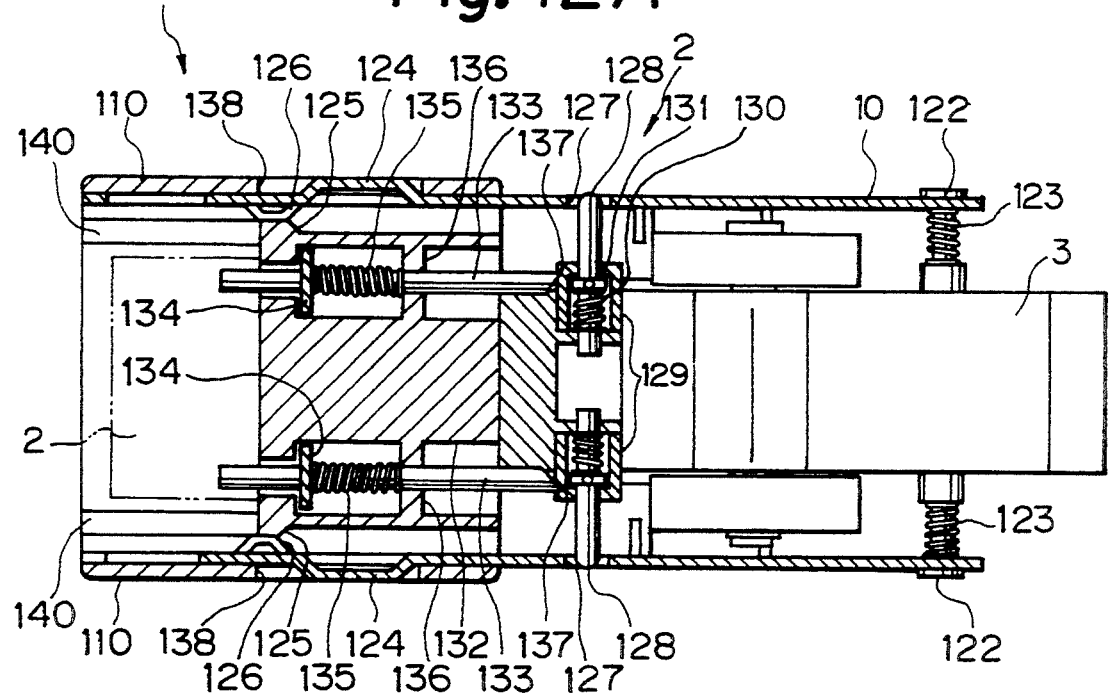
FIGS. 12A, 12B and 12C are fragmentary longitudinal sectional views of a fifth embodiment of the coupling device in accordance with the present invention, illustrating the respective positions (A), (B) and (C) prior to coupling, at incomplete coupling, and at complete coupling.

As shown in FIG. 12A, a coupling plate 10 is provided with a restraining hole 127 on a front end. A stopper pin 128 projects from a body 3 in opposition to the hole 127. The stopper pin 128 normally enters in the hole 127 to restrain the coupling plate 10 from sliding on the body 3. The stopper pin 128 is slidably received in an accommodating hole 129 and biased by a spring 130 to project outwardly. The stopper pin 128 is provided on a middle portion with a projection 131 a top end of which extends out of the hole 129.

On the other hand, a housing 2 of the charger connector SC is provided on an upper portion of a proximal end 132 with a pair of release pins 133 which serve to make the stopper pin 128 come out of the hole 127. The release pin 133 is mounted in the proximal end 132 slidably in the longitudinal direction of the housing 2 of the charger connector SC. A distal end of the release pin 133 is directed to a clearance between the housing 2 and the front cover S, so that the pin 133 can be pushed by the front edge of the housing 1. A compression coil spring 135 is disposed on the pin 133 between a flange 134 and a partition 136. The spring 135 biases the pin 133 to project in the clearance between the front cover 5 and the housing 2. Further, a rear end of the release pin 133 extends to the projection 131 on the stopper pin 128 but in FIG. 12A the pins 131 and 128 are separated from each other. However, when the housing 2 of the charger connector SC is advanced to the incomplete coupling position relative to the housing 1 of the car connector BC, an inclined guide face 137 formed on the rear end of the release pin 133 abuts on the projection 131 so that the stopper pin 128 is forced to come out of the hole 127.

A rear cover 139 protects an upper and side rear half portion of the body 3.

Next, an operation and effects of the fifth embodiment will be explained below. After opening lids not shown, the housing 2 of the charger connector SC is pushed onto the housing 1 of the car connector SC. At this time, as described above, the stopper pin 128 is received in the hole 127 to restrain the coupling plate 10 from sliding. Consequently, since the lever 8 is maintained at a given open angle, the operation lever 8 is not closed even if an operator actuates it carelessly. Accordingly, both plates 10 are maintained in a widened position and do not interfere with the projections 22.

Figure 12B:
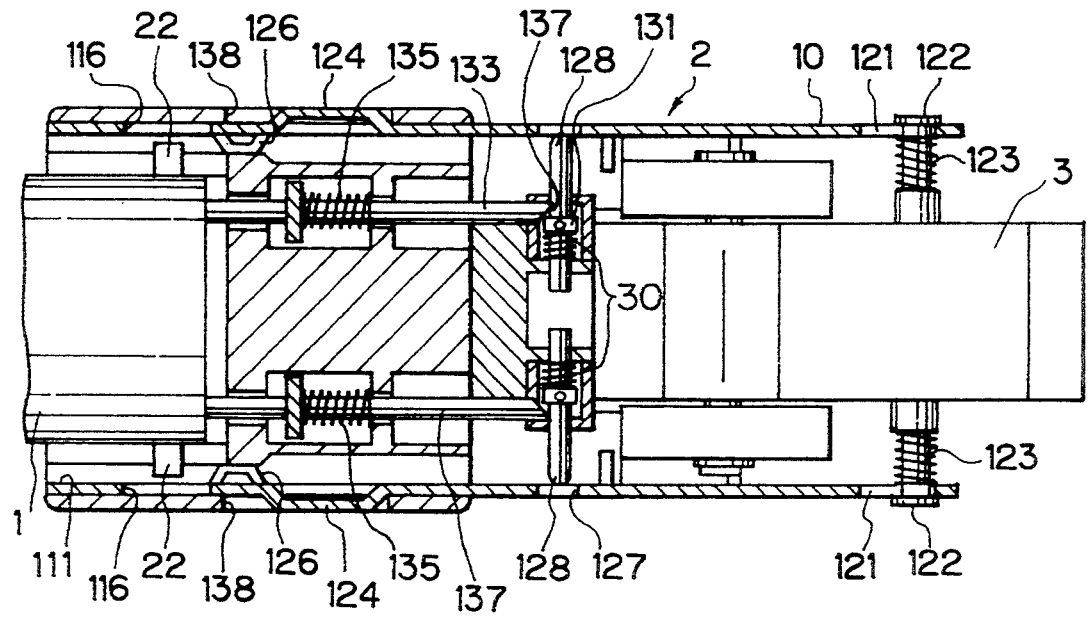
Figure 12C:
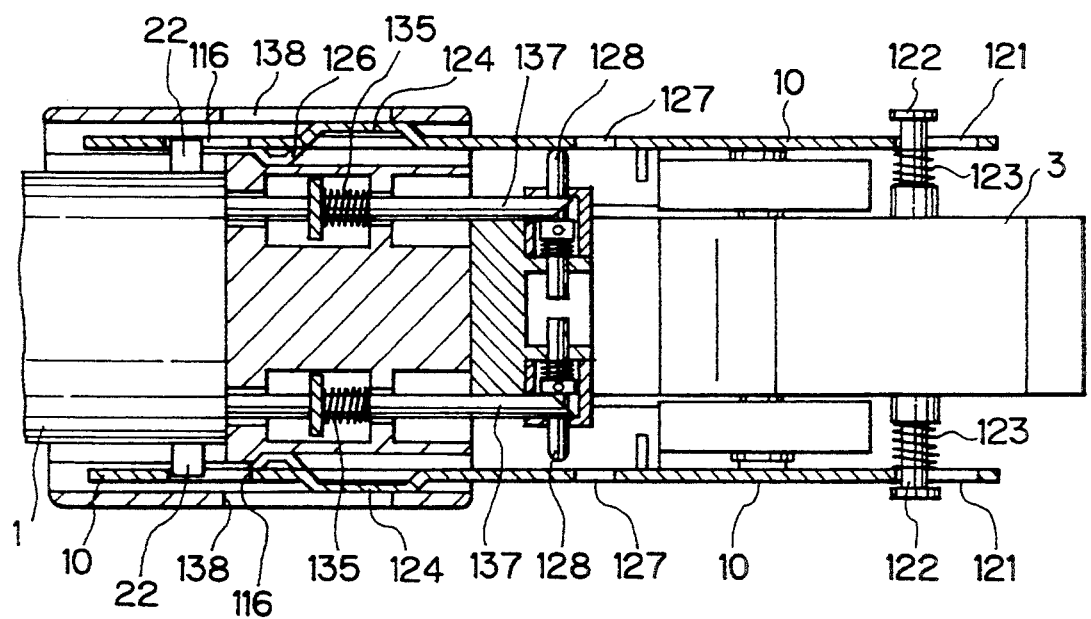

Thus, when the charger connector SC is pushed to the incomplete position shown in FIG. 12B relative to the car connector BC, the release pins 133 are pushed by the front edge of the housing 1 of the car connector BC against the compression coil spring 135. The guide face 137 of the release pin 133 abuts on the projection 131 on the stopper pin 128 to retract the stopper pin 128. Consequently, the stopper pin 128 comes out of the hole 127 and stays inside the coupling plate 10.

Then, when the lever 8 is grasped, the plate 10 receives a backward force. Since the plate 10 is released from the stopper pin 128 at this time, the plate 10 is retracted. At the front side of the plate 10, an outwardly bent portion 124 enters into an expanded portion 110 to engage the projection 22 with the window 116 (see FIG. 12C). If the lever 8 is further actuated, the plate 10 is further retracted. Since a pulling force is applied to the car connector BC, the charger connector SC is pushed to the car connector by a reaction force. Finally, both connectors BC and SC are brought into the complete coupling position. The lever 8 is maintained in this state and the charging work is continued.

When finishing the charging work, the lever 8 is released to return its opening position by the torsion spring 6. When the charger connector SC is pulled, it removes from the car connector BC.

According to the fifth embodiment, since the gripping process is constrained before the charger connector SC is pushed to the incomplete coupling position, the projections 22 on the housing 1 enter into the window 116 in the plate 10. Accordingly, it is possible to prevent the coupling operation from being repeated. Also, locking of the lever 8 makes it easy to apply a coupling force to the car connector BC.

Although a pair of stopper pins and a pair of release pins are provided in this embodiment, a single stopper pin and a single release pin may be provided.

Figure 13A:
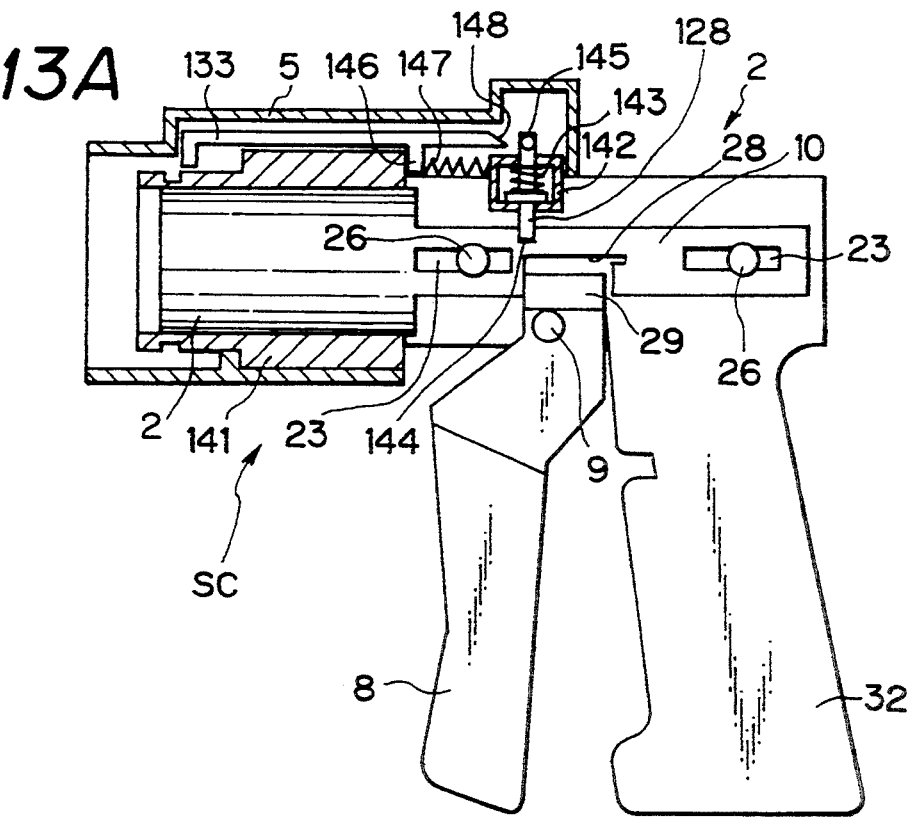
FIGS. 13A and 13B are fragmentary longitudinal sectional views of a sixth embodiment of the coupling device in accordance with the present invention, illustrating the respective positions (A) and (B) prior to coupling and at incomplete coupling.
Figure 13B:
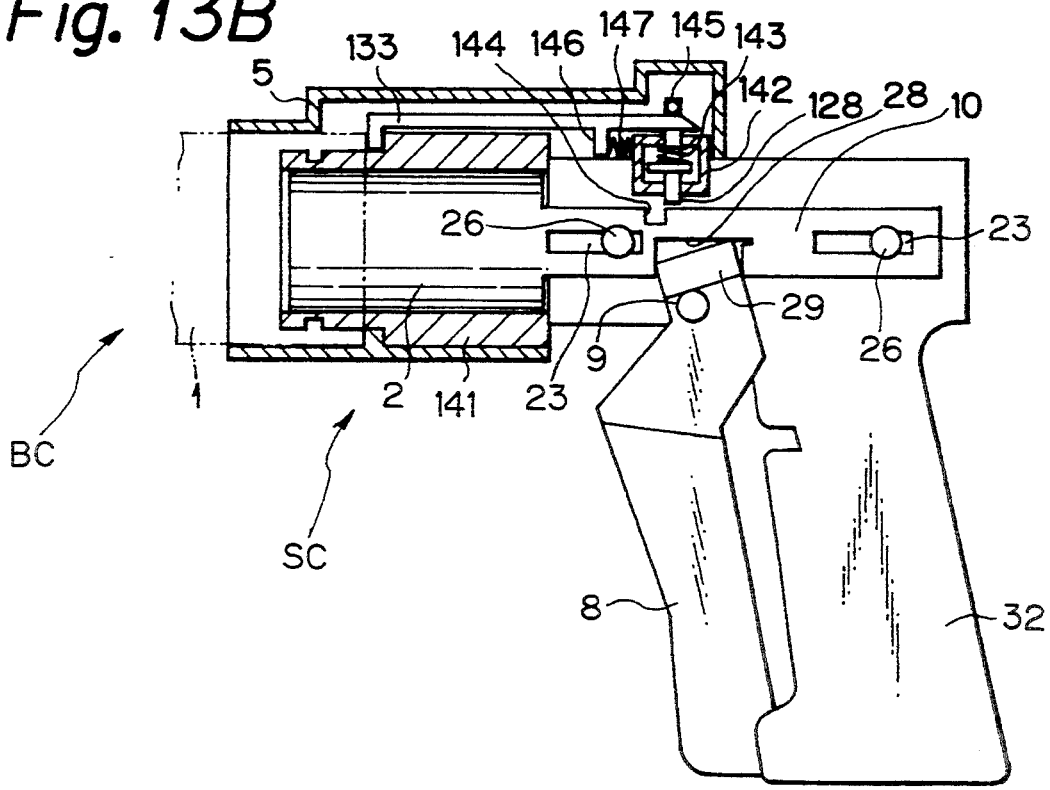

Next, a sixth embodiment of the coupling device of this invention will be described below by referring now to FIGS. 13A and 13B. In this embodiment, another restraining means for an operational lever 8 is provided. In the sixth embodiment, a housing 2 of the charger connector SC is movably mounted in a guide cylinder 141 disposed in a front cover 5. A coupling plate 10 is secured to the housing 2. The coupling plate 10 is provided on front and rear ends with slits 121a and 121b, respectively. A pin 122 having a head is movably inserted in the slits 121a and 121b. When the lever 8 is grasped, the coupling plate 10 is advanced to completely interconnect the connectors BC and SC.

The body 3 is provided above the lever 8 with a pin casing 142 for accommodating a stopper pin 128. The stopper pin 128 can move up and down in the casing 142 and is biased downwardly by a spring 143. A lower end of the stopper pin 128 projects out of the pin casing 142 to normally engage with a notch 144 formed in an upper edge of the coupling plate 10, thereby restraining the lever 8 from being handled. Further, an upper end of the stopper pin 128 projects from the pin casing 128 and is provided with a latch piece 145 extending outwardly (vertically on the drawing).

On the other hand, a release pin 133 for the stopper pin 128 is disposed in an upper position in the front cover 5. The release pin 138 is moved forwardly and backwardly by means of a guide not shown. A front end of the release pin 133 is bent and directed to a clearance between the front cover 5 and the guide cylinder 141. The front end is adapted to be pushed by the front edge of the housing 1 of the car connector BC. A spring-bearing leg 146 projects on an intermediate position on the release pin 133. The release pin 133 is biased forwardly by a compression coil spring 147 disposed between the leg 46 and the pin casing 142 so that the leg 146 is normally pushed to the rear end of the guide cylinder 141. The release pin 133 is provided on a rear end with an inclined face 148 which is normally separated away from the stopper pin 128. When the housing 2 of the charger connector SC is inserted into the housing 1 of the car connector 1 by a given depth, the rear end of the release pin 133 engages with the latch piece 145 to rise it, thereby enabling the plate 10 to be released from the stopper pin 128.

Another construction as well as the locking means which maintains the lever at the closing position is the same as that of the fifth embodiment.

Next, an operation and effects of the sixth embodiment will be explained below. The stopper pin 128 engages with the notch 144 in the coupling plate 10 to restrain the plate 10 from sliding until the housing 2 of the charger connector SC is inserted into the housing 1 of the car connector BC by the given depth. Consequently, the lever 8 is constrained from moving to the closing position. When the connectors BC and SC are brought into the given coupling position, the front edge of the housing 1 pushes the release pins 133 to raise the stopper pins 128 so that the stopper pins 128 come out of the notch 144. Then, when the lever 8 is actuated to the closing position, the coupling plate 10 is advanced and the connectors SC and BC are completely interconnected.

When the lever 8 is returned to the opening position after charging, the coupling plate 10 is retracted from the advanced position and the charger connector SC is also retracted, thereby bringing the connectors BC and SC to the intermediate coupling position. If the charger connector SC is pulled from this position, it is detached from the car connector BC.

It is possible in the sixth embodiment to smoothly carry out the coupling operation, since the lever 8 is restrained from turning before the connectors BC and SC are brought into the intermediate position and the aiding mechanism for coupling is actuated upon the given incomplete coupling state, that is, only upon a regular period.

Although the stopper pin 128 engages with the plate 10 in this embodiment, the stopper pin may directly engage with the lever 8.

Next, a seventh embodiment of the coupling device of the present invention will be described below by referring to FIGS. 14, 15A and 15B. The seventh embodiment further comprises a mechanism for detachably and temporarily interconnects both connectors BC and SC.

Figure 14:
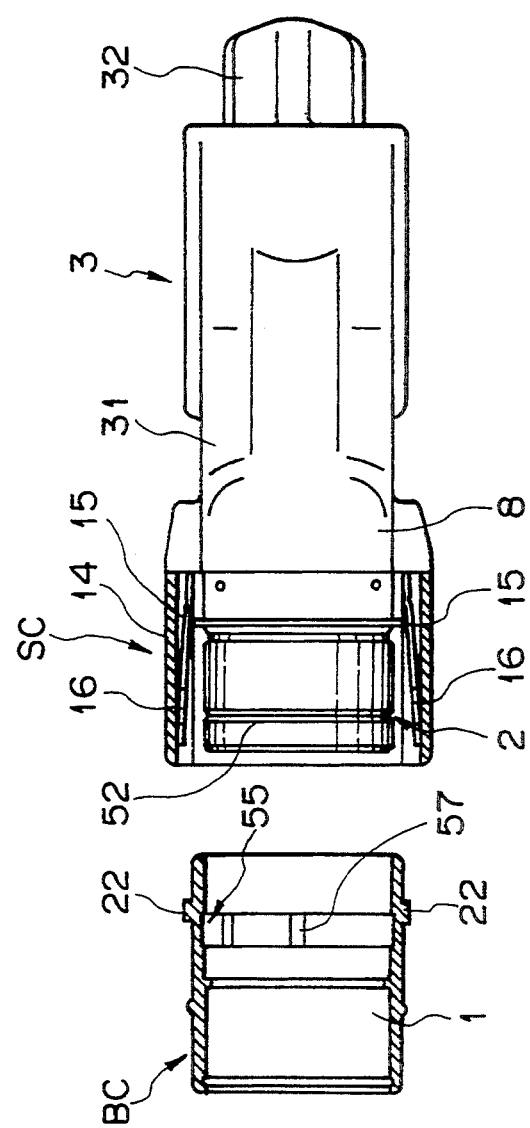
FIG. 14 is an exploded plan view of a seventh embodiment of the coupling device in accordance with the present invention.

A metal retaining ring 55 which serves to maintain the charger connector SC in a temporary coupling position is provided at a given depth from an open end on an interior of the housing 1 of the car charger BC, as shown in FIG. 14. As shown in FIGS. 15A and 15B, the ring 55 is fitted in an annular recess 56 formed in the interior of the housing 1. The ring 55 is provided with four retaining pawls 57 disposed at an equiangular distance. The retaining pawl 57 is provided with a slit extending in a coupling direction of the charger connector SC (one end of the slit reaches an edge of the pawl 57) and a rib projecting inwardly in the diametrical direction. The rib can be deformed outwardly in the diametrical direction.

The housing 2 of the charger connector SC is provided on an exterior with a groove 52 which detachably receives the pawls 57 on the car connector BC. When the pawls 57 engage with the groove 52, the charger connector SC is held in the car connector BC by a clamping force enough to prevent the connector SC from falling down. As shown in FIG. 15A, when the pawls 57 engage with the groove 52 a window 21 in a coupling plate 10 receives projections 22 on the car connector BC. An engagement of the pawls 57 and groove 52 acts as a positioning means for restricting a depth of inserting the plate 10.

As shown in FIG. 14, the distance between the distal ends of the plates is widened normally so that the plates 10 interfere with the projections 22 when the charger connector SC is pushed to the temporary coupling position. However, when the lever 8 is grasped at the temporary coupling position, the plates 10 are slightly retracted, thereby enabling the coupling operation to be carried out.

Figure 15A:
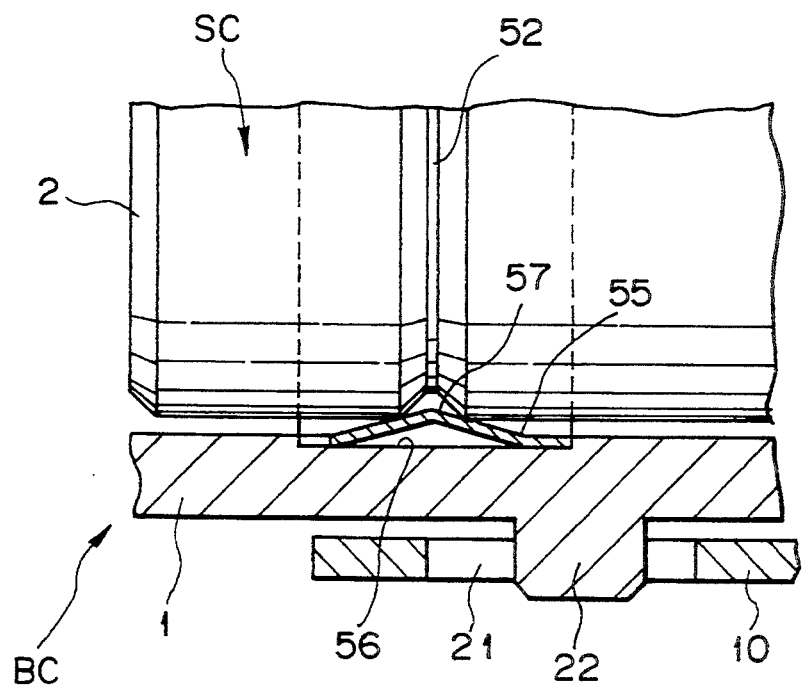
FIGS. 15A and 15B are fragmentary enlarged views shown in FIG. 14, illustrating a position (A) at temporarily coupling and a position (B) at completely coupling.
Figure 15B:
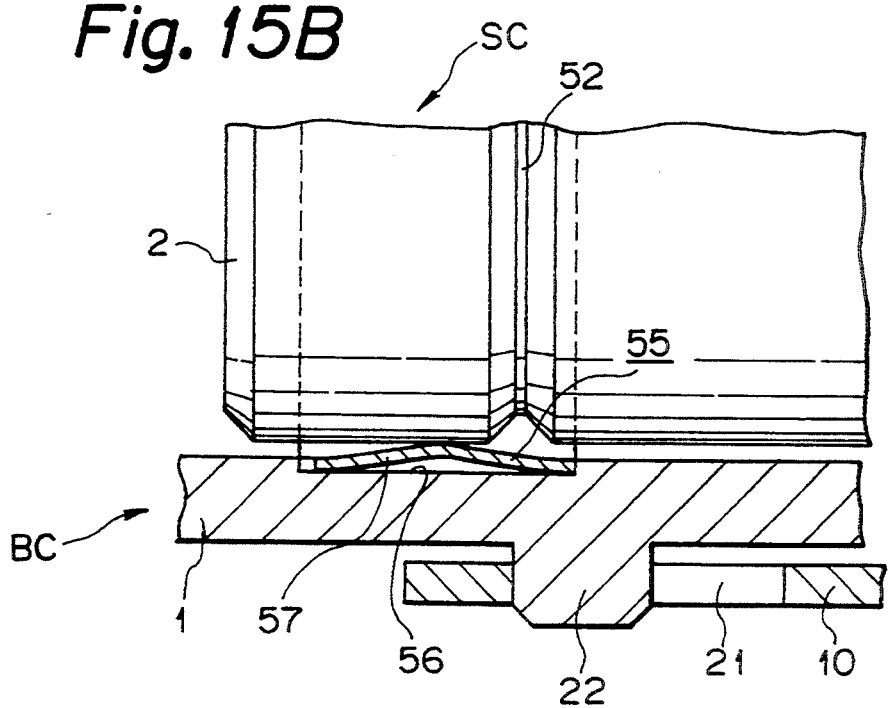

The charger connector SC is held in the temporary coupling position by engagement of the pawls 57 and groove 52 (see FIG. 15A).

Since the charger connector SC is maintained in the temporary coupling position in this embodiment, it is not necessary to continue to apply a pushing force (coupling force) to the lever 8 until the charger connector SC is displaced to the complete coupling position (FIG. 15B) and thus coupling operation becomes easier. It is also possible to avoid an accident in which the charger connector SC falls from the car connector in the temporary coupling position and is broken. It is possible to handle the lever without any error and enhance charging work since the timing of grasping the lever is limited.

Next, an eighth embodiment of the coupling device of the present invention will be described below by referring to FIGS. 16A, 16B and 17. This embodiment further comprises means for commencing conduction upon completely interconnecting both connectors BC and SC.

Figure 17:
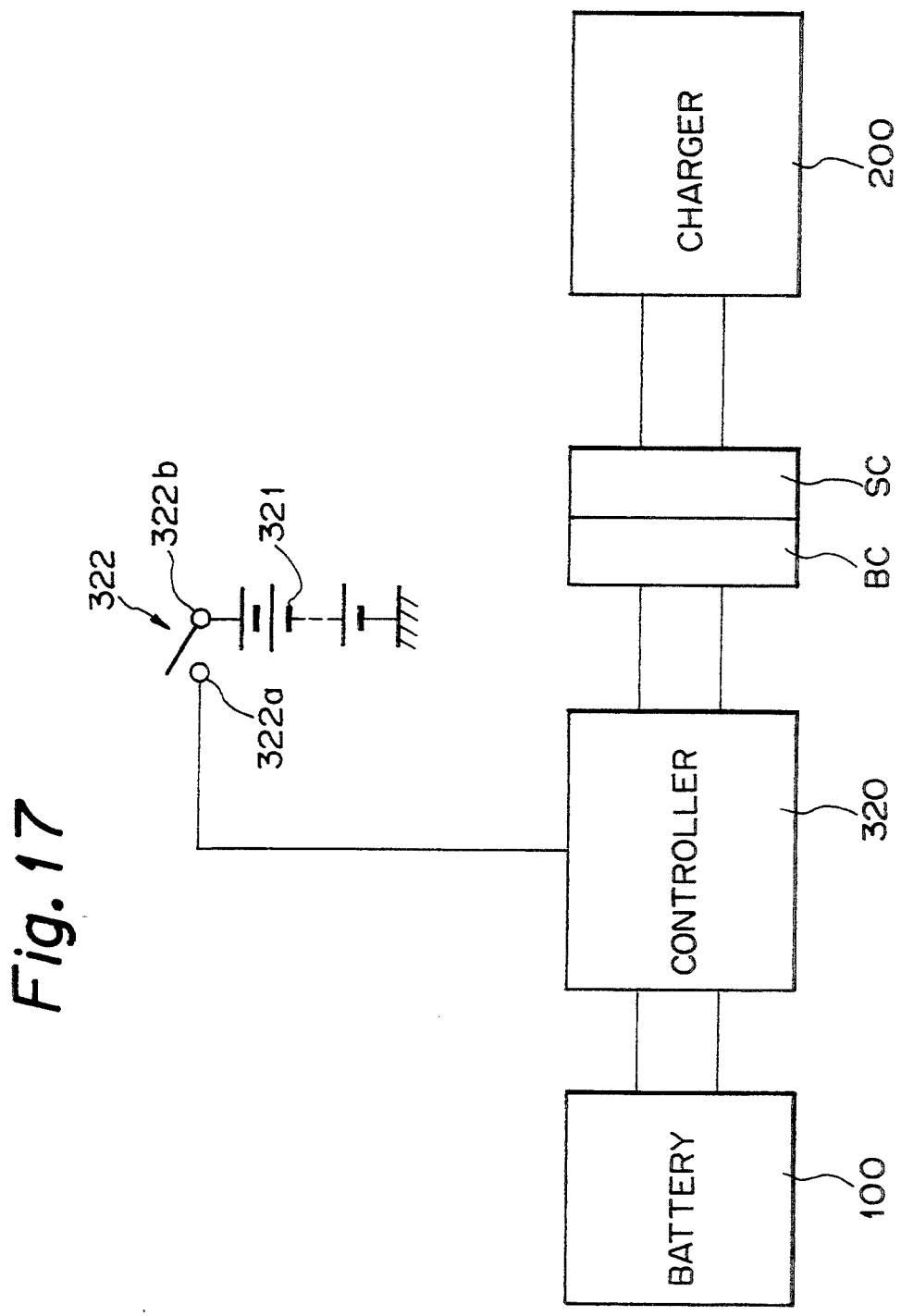
FIG. 17 is a circuit diagram of a charging circuit shown in FIGS. 16A and 16B.

As shown in FIG. 17, a controller 320 (for example, a relay circuit) is provided between the car connector BC and the battery 100 in the car. A switch 322 which sends a signal to the controller 320 is provided on the grip 32 between the controller 320 and a supply power source 321. The switch 322 includes a stationary contact 322a and a movable contact 322b opposing to an inner face of the lever 8. The movable contact 322b is biased outwardly by a compression coil spring 322d wound on an axis 322c to separate from the stationary contact 322a normally. The movable contact 322b contacts with the stationary contact 322a only when the lever 8 is grasped to the closing position. In this embodiment, a projection 323 is provided on the inner face of the lever 8 to readily press the movable contact 322b.

When the lever 8 is grasped to the closing position, the connectors BC and SC are brought into the complete coupling position in which terminals are interconnected regularly. Upon the complete coupling position, the projection 323 on the lever 8 presses the movable contact 322b to contact with the stationary contact 322a, thereby closing the switch 322. The switch outputs a signal to the controller 320, which closes the charging circuit to flow a current from the charger 200 to the battery 100.

In this embodiment, the charging circuit is closed to be able to be charged after completely coupling the connectors BC and SC and the connectors in the incomplete coupling position is constrained from charging.

Accordingly, it is possible to prevent occurrence of abnormal heat and sparks and to carry out a safe charging work.

Next, a tenth embodiment of the coupling device of the present invention will be described below by referring to FIGS. 18 to 21. This embodiment further comprises means for commencing conduction and having a switch member 622 which is provided on a gripping portion of an operation lever 8 and shuts off a charging circuit only when the switch member 622 is actuated.

Figure 20A:
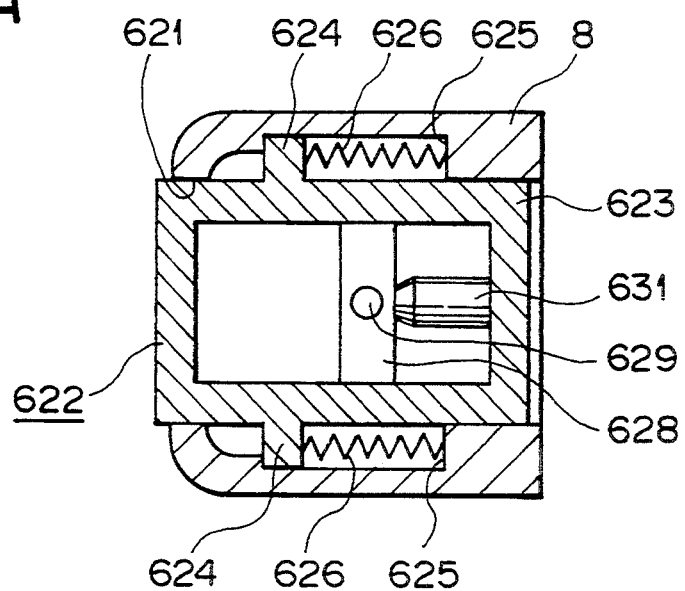
FIGS. 20A and 20B are fragmentary plan sectional views corresponding to FIGS. 19A and 19B, illustrating an ON-position (A) and another switch and an OFF-position (B) of the switch.
Figure 20B:
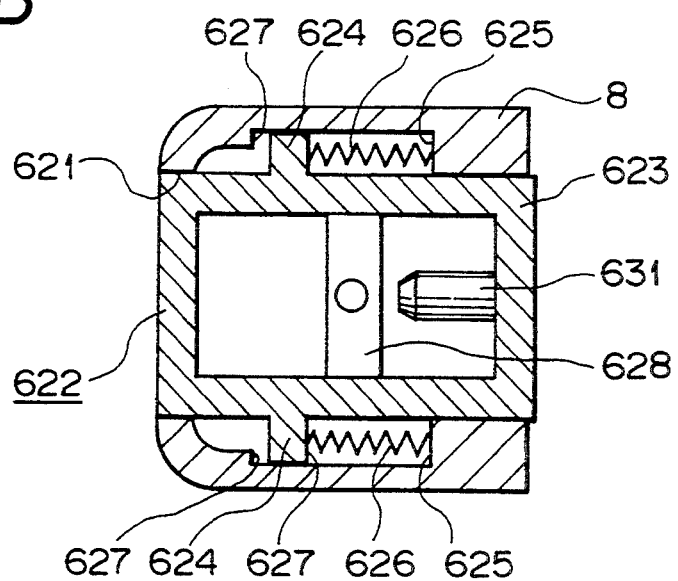

As shown in FIGS. 20A and 20B, a lever 8 is formed into a U-shaped cross section. The lever 8 is provided on a front side with an opening 621 which receives the switch member 622. The switch member 622 is formed into a box 623 which is open at up and down sides. The box 623 is provided on opposite sides with projections 624. A compression coil spring 626 is disposed between the projection 624 and a shoulder 625 on a rear side of the lever 8. The switch member 622 is normally biased to a front side shoulder 627 by the spring 626.

Figure 18:
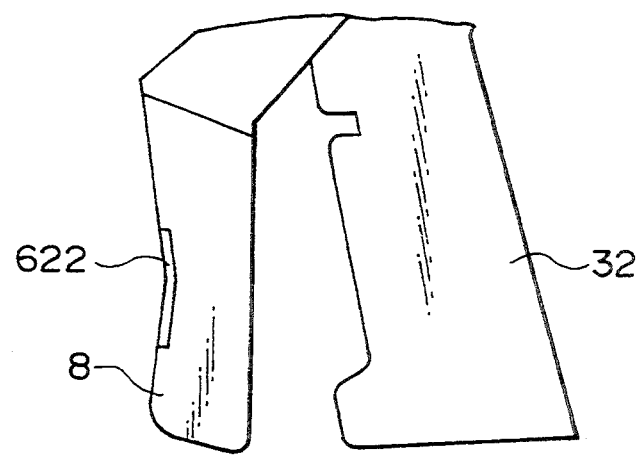
FIG. 18 is a fragmentary side view of a ninth embodiment of the coupling device in accordance with the present invention.
Figure 19A:
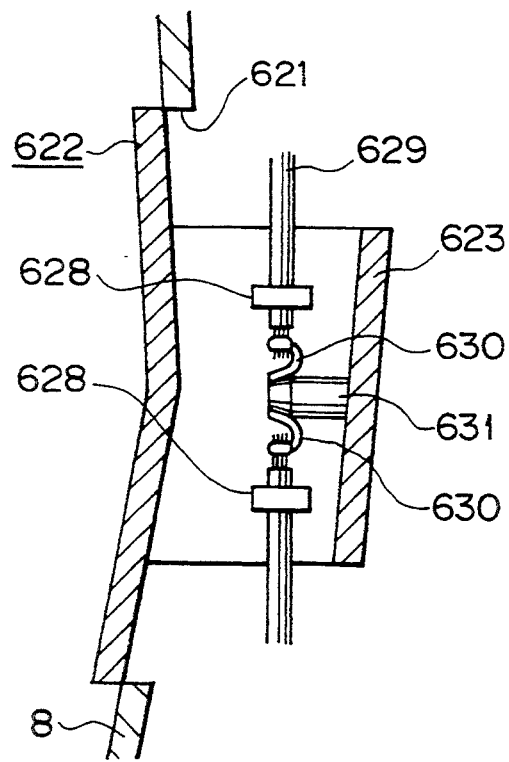
FIGS. 19A and 19B are fragmentary side sectional views; illustrating an ON-position (A) of a switch and an OFF-position (B) of the switch.
Figure 19B:
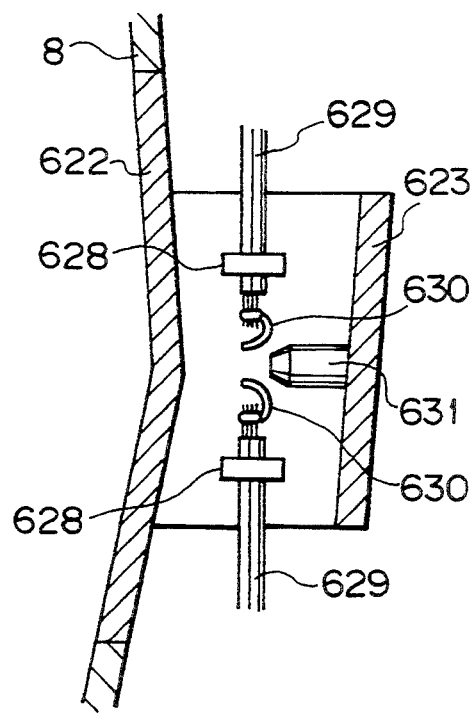

As shown in FIGS. 18, 19A and 19B, support bars 628 are bridged at upper and lower positions in the box 623. The support bar 628 support an end of a circuit terminal cord 629 (preferably having flexibility). The ends of the circuit terminal cords 629 are connected to stationary spring contacts 630 which are spaced away from each other by a given distance. The box 623 is provided on an inner wall with the movable contact 631 which is directed to the stationary contacts 630. In such switch means constructed above, the movable contact 631 is normally pushed between the stationary contacts 630 to close the switch means. When the switch member 622 is pushed to retract the movable contact 631, the movable contact 631 leaves from the stationary contacts 630 to open the switch means.

Figure 21:
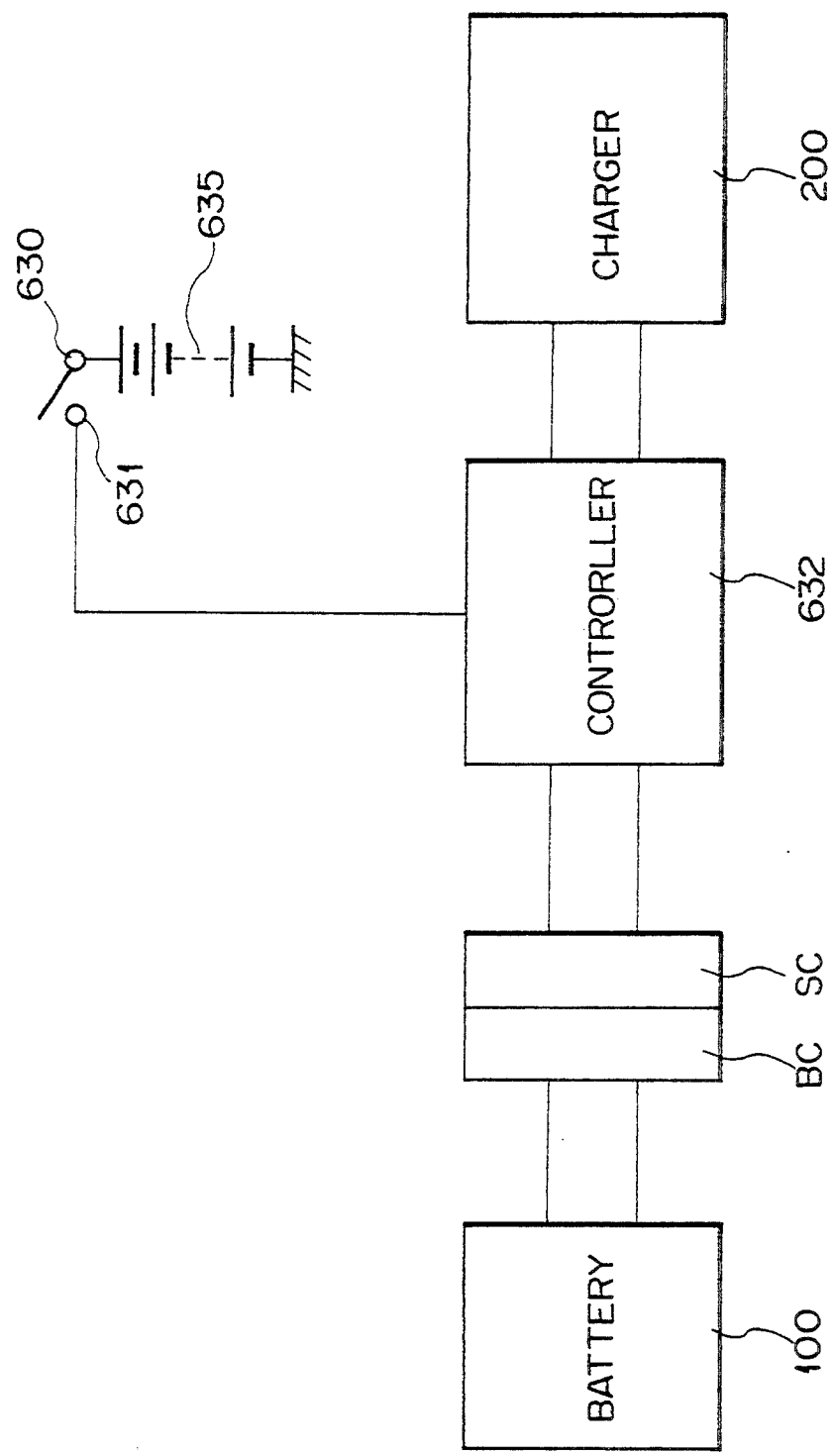
FIG. 21 is a circuit diagram of a charging circuit.

FIG. 21 shows a charging circuit for the battery 100 in the car. A controller 632 (for example, a relay circuit) is arranged between the charger connector SC and the charger 200. The switch means sends an on-off signal to the controller 632 through a supply power source 635. When the switch means is closed, the controller 632 permits the charging circuit to pass the charging current. When the switch circuit is opened, the controller 632 inhibits the charging circuit to pass the charging current.

When the grip 32 and lever 8 on the charger connector side are grasped to start charging, the movable contact leaves from the stationary contacts 631. Consequently, the switch member 622 is depressed so long as the operator holds the charger connector SC. Even if any failure of insulation should occur in the charger connector SC, the operator is not to subject to an electrical shock and he can work safely.

When the operator lets loose his hand from the charger connector, the switch member 622 returns to the original position by means of the spring 626 so that the movable contact 631 is pushed between the stationary contacts 630. Since the contacts 630 are connected through the contact 631, the controller 632 closes the charging circuit to make it a conduction state. Thus. the battery 100 in the car is charged through the coupled connector BC and SC from the charger 200.

What is claimed is:

1. A coupling device of a charging connector assembly for an electric car, wherein a car connector and a charger connector are interconnected to charge a battery in the electric car, comprising:

a body having a barrel portion and a grip;

an operation lever pivotably connected to a proximal end of said barrel portion and biased by an elastic member toward a direction moving away from said grip;

means for locking said operation lever at a closing position near said grip;

a link mechanism mounted on a proximal end of said barrel portion and engaging with an end of said operation lever;

a front cover mounted on a distal end of said barrel portion for accommodating said charger connector; and coupling means mounted on said barrel portion movably along the longitudinal direction of said barrel portion and having an end coupled to said link mechanism and the other end coupled to either one of both said connectors.

2. A coupling device according to claim 1, wherein said link mechanism translates a swinging motion of said operation lever into a linear reciprocating motion of said coupling means, wherein said link mechanism comprises a support axis for rotatably supporting said operation lever on the proximal end of said barrel portion, a guide member for movably supporting said coupling means on said barrel portion, and a joining member for slidably joining said operation lever and said coupling means together, wherein said support axis is disposed at a position above said joining member, wherein said coupling means is provided on the other end with engaging means, and wherein said coupling means are moved back toward the proximal end of said barrel portion, so that said engaging means engage with said car connector, when said operation lever is actuated to move to said closing position, thereby interconnecting both said connectors.

3. A coupling device according to claim 1, wherein said link mechanism translates a swinging motion of said operation lever into a linear reciprocating motion of said coupling means, wherein said link mechanism comprises a support axis for rotatably supporting said operation lever on the proximal end of said barrel portion, a guide member for movably supporting said coupling means on said barrel portion, and a joining member for slidably joining said operation lever and said coupling means together, wherein said support axis is disposed at a position below said joining member, wherein the other end of said coupling means is connected to said charger connector; wherein said charger connector is received slidably in said front cover, and wherein said coupling means are moved forth toward the distal end of said barrel portion, when said operation lever is actuated to move said closing position, thereby interconnecting both said connectors.

4. A coupling device according to claim 1 wherein said locking means include a member which detachably interconnects lower ends of said operation lever and grip.

5. A coupling device according to claim 1, further comprising means for starting electrical conduction when both said connectors are completely coupled.

6. A coupling device according to claim 2, further comprising a mechanism for temporarily and detachably coupling both said connectors.

7. A coupling device according to claim 2, further comprising means for restraining said operation lever from moving to said closing position until both said connectors reach a given incomplete coupling position.

8. A coupling device according to claim 3, further comprising means for restraining said operation lever from moving to said closing position until both said connectors reach a given incomplete coupling position.

9. A coupling device according to claim 4, wherein said coupling member is a retaining ring.

10. A coupling device according to claim 4, wherein said coupling member is a plunger.

11. A coupling device according to claim 5, wherein said coupling member is a lock piece.

12. A coupling device according to claim 5 wherein said starting means of electrical conduction include a switch which is closed when said operation lever is moved to said closing position.

13. A coupling device according to claim 5 wherein said starting means of electrical conduction include a switch member provided on a pushing portion of said operation lever for turning a charging circuit off only upon actuating said pushing portion.

* * * * *